United States Patent Office 3,179,698
Patented Apr. 20, 1965

3,179,698
$\Delta^3$-A-NORPREGNENE-2,15,20-TRIONE AND
$\Delta^{3,14}$-A-NORPREGNADIENE-2,20-DIONE
Frank L. Weisenborn and Allen I. Laskin, both of Somerset, N.J., assignors to Olin Mathieson Chemical Corporation, New York, N.Y., a corporation of Virginia
No Drawing. Filed Apr. 30, 1962, Ser. No. 191,252
2 Claims. (Cl. 260—586)

This invention relates to steroids of the A-norpregnane series and to a method for producing such compounds. More particularly this invention relates to 15α-hydoxy-$\Delta^3$-A-norpregnene-2,20-dione and to derivatives thereof. Such derivatives includes esters thereof with hydrocarbon carboxylic acids, organic sulfonic acids, the corresponding 15-keto compound as well as $\Delta^{3,14}$-A-norpregnadiene-2,20-dione.

According to this invention, 15α-hydroxy-$\Delta^3$-A-norpregnene-2,20-dione is first prepared by subjecting A-norprogesterone, air and enzymes of non-proliferating cells of *Colletotrichum linicola* under oxidizing conditions. The oxidation may be effected either by including the starting material in an aerobic culture of the microorganism or by bringing together, in an aqueous medium the A-norprogesterone, air and enzymes of non-proliferating cells of the microorganism.

In general, the conditions for culturing the *Colletotrichum linicola* for the purposes of this invention are the same as those for obtaining cultures of actinomycetes for the production of antibiotics or vitamin $B_{12}$, i.e., the microorganism is aerobically grown in contact with a suitable fermentation medium. A suitable fermentation medium comprises a source of nitrogren and a source of carbon and energy. The latter may be a carbohydrate such as sucrose, molasses, glucose, maltose, starch or dextrin, a fatty acid, a fat and/or the steroid itself. Preferably, however, the medium includes an assimilable source of carbon and energy in addition to the steroid.

Organic source of nitrogen may be used, e.g. soybean meal, cornsteep liquor, meat extract and/or distillers' solubles, or synthetic materials may be used, i.e. simple, synthesizable organic or inorganic compounds such as ammonium salts, alkali nitrates, amino acids or urea.

An adequate sterile air supply should be maintained during fermentation, for example by the conventional methods of exposing large surfaces of the medium to air or by utilizing submerged aerated cultures. The A-norprogesterone may be added to the culture during the incubation period or included in the medium prior to sterilization or inoculation. The preferred range of concentration of the starting material in the culture is about 0.01 to about 0.10%, but concentrations within a broader range may also be used. The culture period may vary considerably, the range of about 6 to 96 hours being feasible.

The culturing of A-norprogesterone with *Colletotrichum linicola* as described above yields 15α-hydroxy-$\Delta^3$-A-norpregnene-2,20-dione. This compound forms esters with organic acids, particularly organic hydrocarbon carboxylic acids, especially those with less than 10 carbon atoms. Such organic hydrocarbon carboxylic acids include the lower alkanoic acids as, for example, acetic, propionic, butyric and enanthic acids, lower alkenoic acids, for example propenoic acid, aralkanoic acids preferably phenyl-lower alkanoic acids, for example α-toluic and β-phenylpropionic acids, cycloalkane carboxylic acids, preferably having 4 to 6 carbon atoms in the ring, and aromatic acids, for example benzoic and o-, m-, or p-toluic acids. Sulfonic acid derivatives may also be formed. These include, for example, alkanesulfonic acids such as methanesulfonic acid, ethanesulfonic acid, as well as arylsulfonic acids, such as benzenesulfonic acid and toluenesulfonic acid.

The esters of 15α-hydroxy-$\Delta^3$-A-norpregnene-2,20-dione are prepared in conventional manner, for example, by treatment with the appropriate acid anhydride, acyl halide or sulfonyl halide in an organic solvent, preferably an organic base such as pyridine.

15α-hydroxy-$\Delta^3$-A-norpregnene-2,20-dione may be converted to $\Delta^3$-A-norpregnene-2,15,20-trione by oxidation, e.g. with chromic acid and sulfuric acid, in an organic solvent such as acetone.

$\Delta^{3,14}$-A-norpregadiene-2,20-dione may also be derived from 15α - hydroxy - $\Delta^3$-A-norpregnene-2,20-dione. This may be achieved by converting this compound to a sulfonic acid ester, e.g. the mesylate, and heating the latter, e.g. up to about reflux temperature, in a non-aqueous, basic system, for example, propionic acid and sodium acetate, preferably in the absence of air.

The compounds of this invention are physiologically active compounds which have antiandrogenic activity, i.e. they inhibit the action of androgens such as testosterone and can be used to inhibit the development of male characteristics or hyperandrogenic acne caused by the presence of an excess amount of testosterone. They may be administered topically or systemically in conventional forms such as ointments, creams, tablets, elixirs, capsules, injectables and the like by incorporating an appropriate concentration based on the activity of the particular compound and requirements of the patient together with conventional vehicles, excipients and the like.

The following examples are illustrative of the invention. All temperatures are expressed in degree centigrade.

EXAMPLE 1

*15α-hydroxy-$\Delta^3$-A-norpregnene-2,20-dione*

A. FERMENTATION

Surface growth from each of 5 (10 day) old agar slant cultures of *Colletotrichum linicola*, NCTC (National Collection of Type Cultures) No. 1194 (obtainable from the Commonwealth Mycological Institute, Kew, Surrey, England), the slant containing as a nutrient medium (A):

|  | G. |
|---|---|
| Glucose | 10 |
| Yeast extract | 2.5 |
| $K_2HPO_4$ | 1 |
| Agar | 20 |
| Distilled water to 1 liter. | | is suspended in 2.5 ml. of a 0.01% sodium lauryl sulphate aqueous solution. One ml. portions of the suspension are used to inoculate 10 250 ml. conical flasks, each containing 50 ml. of the following sterilized medium (B):

|  | G. |
|---|---|
| Dextrose | 10 |
| Corn steep liquor | 6 |
| $NH_4H_2PO_4$ | 3 |
| Yeast extract | 2.5 |
| $CaCO_3$ | 2.5 |
| Distilled water to 1 liter. | |

After 72 hours' incubation at 25° C. with continuous rotary agitation (280 cycles per minute; 2 inch radius), 10% (vol./vol.) transfers are made to 67 250 ml. conical flasks each containing 50 ml. of fresh sterilized medium B plus 300 micrograms/ml. of A-norprogesterone. The steroid is added by supplementing each flask with 0.25 ml. of a sterile solution of the steroid in N,N-dimethylformamide containing 60 mg./ml. of steroid. A total of 1 gram is used. After 24 hours of further incubation, the contents of the flasks are pooled through a Seitz clarifying pad. The flasks, mycelium and pads are washed with successive 50 ml. portions of warm water. The combined filtrate and washings have a volume of 3,640 ml.

B. ISOLATION AND CHARACTERIZATION

The combined filtrate and washings (3,640 ml.) are extracted three times with 1 l. portions of chloroform. The combined chloroform extracts are washed with water, saturated sodium chloride solution, dried over sodium sulfate and concentrated to dryness under vacuum leaving about 762 mg. of crude product. This material is chromatographed on 30 g. of Merck's acid washed alumina. Elution of the column with 30–80% chloroform-benzene yields 537 mg. of pure 15α-hydroxy-$\Delta^3$-A-norpregnene-2,20-dione which is crystallized from acetone-hexane, M.P. 240–241°; $[\alpha]_D$ +107.5° (chloroform);

$\lambda_{max}^{alc.}$ 234 m$\mu$ (16,500); $\lambda_{max}^{Nujol}$ 2.87$\mu$, 5.85$\mu$, 5.95$\mu$, 6.16$\mu$

*Analysis.*—Calcd. for $C_{20}H_{28}O_3$: C, 75.91; H. 8.92. Found: C, 76.07; H, 8.65.

EXAMPLE 2

*15α-acetoxy-$\Delta^3$-A-norpregnene-2,20-dione*

15α-hydroxy-$\Delta^3$-A-norpregnene-2,20-dione (25 mg.) is dissolved in 5 ml. of pyridine and 2.5 ml. of acetic anhydride and the solution allowed to stand at room temperature overnight. The solvents are removed under vacuum and the residue distributed between chloroform and water. The chloroform extract is dried over magnesium sulfate, concentrated to dryness and the product recrystallized from acetone-hexane to give 24 mg. of 15α-acetoxy-$\Delta^3$-A-norpregnene-2,20-dione, M.P. 133–134°, $[\alpha]_D$ +74° (chloroform), $\lambda_{max}^{EtOH}$ 232 m$\mu$ ($\epsilon$ = 16,500)

*Anal.*—Calcd. for $C_{22}H_{30}O_4$: C, 73.71; H. 8.44. Found: C, 73.96; H, 8.43.

EXAMPLE 3

*$\Delta^3$-A-norpregnene-2,15,20-trione*

To a solution of 15α-hydroxy-$\Delta^3$-A-norpregnene-2,20-dione (100 mg.) in 25 ml. of acetone is added dropwise with stirring an equivalent amount of a chromic acid-sulfuric acid in acetone solution. The precipitate of chromic acid salts is centrifuged off and the supernatant liquid concentrated to dryness. The residue is dissolved in chloroform, washed with 5% sodium bicarbonate solution, water, dried over magnesium sulfate and concentrated. The product is recrystallized from acetone-hexane to yield about 78 mg. of $\Delta^3$-A-norpregnene-2,15,20-trione, M.P. 182–183°, $[\alpha]_D$ +99° (chloroform).

*Analysis.*—Calcd. for $C_{20}H_{26}O_3$: C, 76.40; H, 8.34. Found: C, 76.26; H, 8.56.

EXAMPLE 4

*15α-mesyloxy-$\Delta^3$-A-norpregnene-2,20-dione*

15α-hydroxy-$\Delta^3$-A-norpregnene-2,20-dione (50 mg.) is dissolved in 1.5 ml. of pyridine, the solution cooled to 0° C., and 0.1 ml. of methane-sulfonyl chloride added. This solution is allowed to stand in the refrigerator for 16 hours, poured into ice water, and extracted with chloroform. The chloroform extract is washed with dilute hydrochloric acid, water, dried over magnesium sulfate and concentrated to dryness in vacuo. The residue is recrystallized from ethyl acetate-hexane to yield 38 mg. of 15α-mesyloxy-$\Delta^3$-A-norpregnene-2,20-dione, M.P. 144–145°, $[\alpha]_D$ +59° (chloroform).

*Analysis.*—Calcd. for $C_{21}H_{30}O_5S$: C, 63.93; H, 7.67. Found: C, 63.72; H, 7.79.

EXAMPLE 5

*$\Delta^{3,14}$-A-norpregnadiene-2,20-dione*

A solution of 36 mg. of 15α-mesyloxy-$\Delta^3$-A-norpregnene-2,20-dione, 3.5 ml. of propionic acid, and 130 mg. of sodium acetate is heated under reflux for four hours in a nitrogen atmosphere. The solution is then diluted with water and extracted with chloroform. The chloroform extract is washed free of propionic acid with 5% sodium carbonate solution, dried over magnesium sulfate, and concentrated to dryness in vacuo. The residue is purified by a chromatography on alumina whereby $\Delta^{3,14}$-A-norpregnadiene-2,20-dione is obtained by elution with 10% chloroform benzene. Recrystallization from acetone-hexanne yields about 17 mg. of desired product, M.P. 155–156°; $[\alpha]_D$ −8° (chloroform), $\lambda_{max}^{EtOH}$ 232 m$\mu$ ($\epsilon$ = 15,900)

*Anaylsis.*—Calcd. for $C_{20}H_{26}O_2$: C, 80.49; H, 8.78. Found: C, 80.48; H, 8.85.

What is claimed is:
1. $\Delta^3$-A-norpregnene-2,15,20-trione.
2. $\Delta^{3,14}$-A-norpregnadiene-2,20-dione.

References Cited by the Examiner
UNITED STATES PATENTS

| | | | |
|---|---|---|---|
| 2,707,190 | 4/55 | Farrar | 260—397.45 |
| 2,753,290 | 7/56 | Fried et al. | 260—397.45 XR |
| 2,950,289 | 8/60 | Weisenborn | 260—456 |
| 2,960,434 | 11/60 | Dulaney et al. | 195—51 |
| 3,005,017 | 10/61 | Lerner et al. | 260—488 |
| 3,005,018 | 10/61 | Weisenborn et al. | 260—488 |
| 3,016,335 | 1/61 | Stoudt. | |

JOSEPH R. LIBERMAN, *Primary Examiner.*

CHARLES B. PARKER, *Examiner.*

UNITED STATES PATENT OFFICE
CERTIFICATE OF CORRECTION

Patent No. 3,179,698  April 20, 1965

Frank L. Weisenborn et al.

It is hereby certified that error appears in the above numbered patent requiring correction and that the said Letters Patent should read as corrected below.

Column 1, line 20, strike out ", air and enzymes of non-proliferating cells of" and insert instead -- to the action of enzymes of the microorganism --; same column 1, line 39, for "source" read -- sources --.

Signed and sealed this 17th day of August 1965.

(SEAL)
Attest:

ERNEST W. SWIDER
Attesting Officer

EDWARD J. BRENNER
Commissioner of Patents